(12) United States Patent
Wu

(10) Patent No.: US 8,835,860 B2
(45) Date of Patent: Sep. 16, 2014

(54) X-RAY IMAGE SENSING DEVICE AND X-RAY IMAGE SENSING MODULE

(75) Inventor: Chih-Hao Wu, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 71 days.

(21) Appl. No.: 13/551,502

(22) Filed: Jul. 17, 2012

(65) Prior Publication Data

US 2013/0026373 A1 Jan. 31, 2013

(30) Foreign Application Priority Data

Jul. 25, 2011 (TW) .............................. 100126139 A

(51) Int. Cl.
*G01T 1/20* (2006.01)
(52) U.S. Cl.
CPC ............. *G01T 1/2018* (2013.01); *G01T 1/2008* (2013.01)
USPC ........................................................ 250/366
(58) Field of Classification Search
USPC ........................................................ 250/366
See application file for complete search history.

(56) References Cited

U.S. PATENT DOCUMENTS

| 2004/0178349 A1* | 9/2004 | Kameshima ............. 250/370.11 |
| 2006/0067472 A1* | 3/2006 | Possin et al. ................. 378/98.9 |
| 2010/0270462 A1* | 10/2010 | Nelson et al. .............. 250/252.1 |

FOREIGN PATENT DOCUMENTS

JP 2000258540 A * 9/2000

* cited by examiner

*Primary Examiner* — David Porta
*Assistant Examiner* — Abra Fein
(74) *Attorney, Agent, or Firm* — Liu & Liu

(57) ABSTRACT

An x-ray image sensing device is provided which includes: a first scintillator layer and a second scintillator layer overlapping with each other and having different energy absorptions of an incident light emitted from an x-ray source such that a first scintillator light and a second scintillator light are emitted from the first scintillator layer and the second scintillator layer, respectively, wherein the first scintillator light and the second scintillator light have different wavelengths; a first photodiode disposed at a side of the first and the second scintillator layers opposite to the X-ray source; and a second photodiode disposed at the side of the first and the second scintillator layers opposite to the X-ray source, wherein the first photodiode and the second photodiode are capable of sensing the first scintillator light and the second scintillator light.

18 Claims, 6 Drawing Sheets

X-RAY IMAGE SENSING DEVICE AND X-RAY IMAGE SENSING MODULE

This Application claims priority of Taiwan Patent Application No. 100126139, filed on Jul. 25, 2011, the entirety of which is incorporated by reference herein.

BACKGROUND OF THE INVENTION

1. Field of the Invention

The present invention relates to an x-ray image sensing device. More particularly, the present invention relates to an x-ray image sensing device suitable for the dual energy x-ray radiography.

2. Description of the Related Art

Radiographic techniques are widely used in modern medicine. In particular, a chest radiograph may provide much and important diagnosis information for chest bones and soft tissues. For example, the chest radiograph may be used for diagnosing bones or soft tissues of lungs, a chest bone structure, upper abdominal organs, a pulmonary vessel structure or cone space of the midthoracic.

Dual energy x-ray radiographic techniques are often used for the chest radiography. The dual energy x-ray radiographic technique is carried out by irradiating x-rays to a body twice in a row, and the two x-ray irradiations are a high energy x-ray and a low energy x-ray, respectively. Since the high energy x-ray and the low energy x-ray can lead to different image contrast, a clear image may be obtained by performing image processing to the sensing images obtained from the two different x-rays by using a calculator. For example, the processed image can only show a bone image or a soft tissue image.

The x-ray image sensing device is usually an indirect x-ray image sensing device, in which only one scintillator layer and one photodiode for sensing the x-ray is included. The x-ray through a human body is absorbed by the scintillator layer and a scintillator light is emitted. The emitted scintillator light is then absorbed by the photodiode and transformed to digital signals.

However, there are some problems which still cannot be resolved using the dual energy x-ray radiographic technique. During the two x-ray irradiations, processing error may occur if the x-ray source or the human body is moved, which is usually referred to as motion blur. In addition, even if the x-ray source and the human body are completely fixed during the two x-ray irradiations, the image may still be blurred due to the heart beating.

Therefore, an x-ray sensing device capable of resolving the motion blur problem and being suitable for the dual energy x-ray radiographic technique is needed.

BRIEF SUMMARY OF THE INVENTION

One object of the present invention is to provide an x-ray image sensing device, including: a first scintillator layer and a second scintillator layer overlapping with each other and having different energy absorptions of an incident light emitted from an x-ray source such that a first scintillator light and a second scintillator light are emitted from the first scintillator layer and the second scintillator layer, wherein the first scintillator light and the second scintillator light have different wavelengths; a first photodiode disposed at a side of the first and the second scintillator layers opposite to the X-ray source; and a second photodiode disposed at the side of the first and the second scintillator layers opposite to the X-ray source, wherein the first photodiode and the second photodiode are capable of sensing the first scintillator light and the second scintillator light.

Still another object of the present invention is to provide an x-ray image sensing module, including: a substrate; a plurality of the x-ray image sensing devices of the above embodiment disposed on the substrate; a gate driver circuit electrically connected to the x-ray image sensing devices; and a data driver circuit electrically connected the x-ray image sensing devices, wherein the gate driver circuit and the data driver circuit are capable of switching on-off the x-ray image sensing devices through time sequence.

BRIEF DESCRIPTION OF THE DRAWINGS

The invention will now be described, by way of example, with reference to the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. For example, the formation of a first feature over, above, below, or on a second feature in the description that follows may include embodiments in which the first and second features are formed in direct contact, and may also include embodiments in which additional features may be formed between the first and second features, such that the first and second features may not be in direct contact. The scope of the invention is best determined by reference to the appended claims.

An x-ray image sensing device capable of being suitable for the dual energy x-ray radiography technique is provided according to an embodiment of the present invention. By using this device, a high energy x-ray sensing image and a low energy x-ray sensing image may be obtained simultaneously with the need of only once x-ray irradiation, and therefore the motion blur problem of the x-ray sensing image can be avoided.

Figure 1:
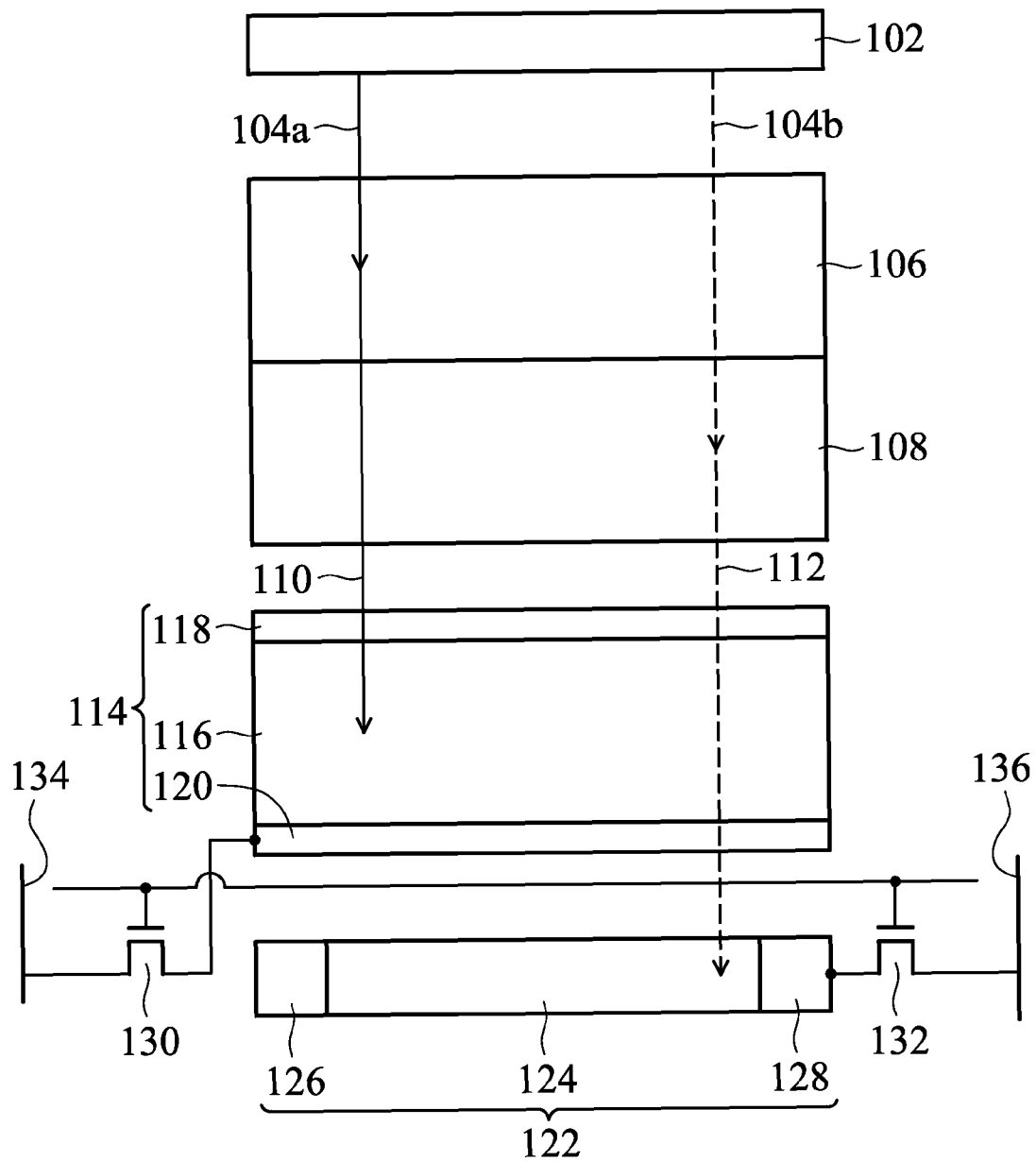
FIG. 1 shows a scheme of an x-ray sensing device and its related devices according to an embodiment of the present invention.

Referring to FIG. 1, illustrated is a scheme of an x-ray sensing device and its related devices according to an embodiment of the present invention. The x-ray sensing device may be an indirect type x-ray image sensing device, in which at least two scintillator layers 106, 108 and two photodiode detecting devices 114, 122 are included. The scintillator layers 106, 108 may absorb low energy x-ray 104*a* and high energy x-ray 104*b* and be excited to emit scintillator lights 110, 112. The scintillator lights 110, 112 may be absorbed by photodiodes 114, 122 and convert the scintillator lights 110, 112 to electrical signals. The electrical signals may be transmitted to a calculator to perform image processing through thin film transistors 130, 132 and data lines 134, 136, and then a desired x-ray image may be obtained.

An x-ray source 102 capable of providing dual energy x-rays for a radiograph is provided. In an embodiment, the x-ray source 102 may simultaneously provide two x-rays having different energy ranges, such as the low energy x-ray 104a and the high energy x-ray 104b. The low energy x-ray 104a may have an energy range from about 40 to about 90 kVp. The high energy x-rat 104b may have an energy range from about 100 to about 160 kVp. For instance, the x-ray source 102 may comprise one or more of a vacuum tube, Hg lamp, synchronic radiation source or combinations thereof.

The scintillator layers 106 and 108 may be overlapped in respect to the x-ray source 102 for achieving a maximum light absorption area. For example, as shown in FIG. 1, the scintillator layer 106 may be disposed on the scintillator layer 108 and overlapped with it (i.e., between the x-ray source 102 and the scintillator layer 108). In an embodiment, at least a portion of the energy range, for example from about 40 to about 90 kVp, of the low energy x-ray 104a may be absorbed by the scintillator layer 106 and a fluorescent light or a phosphorous light 110 (hereafter collectively referred to as scintillator light 110) having a wavelength range of between about 350 and 580 nm is emitted. The scintillator light 110 may be a green light. The scintillator layer 106 may comprise a fluorescent light material or a phosphorous light material, such as CsI:Tl, CsI:Na, $CdWO_4$, $YTaO_4$:Nb, $Gd_2O_2S$:Tb, $Gd_2O_2S$:Pr,Ce,F, $CaWO_4$, $CaHfO_3$:Ce, $SrHfO_3$:Ce, $BaHfO_3$:Ce, NaI:Tl, $LaCl_3$:Ce, $LaBr_3$:Ce, $Bi_4Ge_3O_{12}$, $Lu_2SiO_5$:Ce, $Gd_2SiO_5$:Ce, $YAlO_3$:Ce, $LuAlO_3$:Ce, $Lu_2Si_2O_7$:Ce or combinations thereof. At least a portion of the energy range, for example from about 100 to about 160 kVp, of the high energy x-ray 104b may be absorbed by the scintillator layer 108, and a fluorescent light or a phosphorous light (hereafter collectively referred to as scintillator light 112) having a wavelength range of between about 600 and 800 nm is emitted. The scintillator light 112 may be an infrared light or a near-infrared light. The scintillator layer 108 may comprise a fluorescent light material or a phosphorous light material, such as $Gd_3Ga_5O_{12}$:Cr, Ce, $Y_{1.34}Gd_{0.6}Eu_{0.06}O_3$, $Lu_2O_3$:Eu,Tb or combinations thereof. In addition, the scintillator layer 106 may mostly absorb the low energy x-ray 104a by adjusting the thickness of the scintillator layer 106. Though the scintillator layer 106 may be overlapped over the scintillator layer 108, the high energy x-ray 104b may penetrate the scintillator layer 106 without being absorbed by the scintillator layer 106. Thus, the high energy x-ray 104b may enter into the scintillator layer 108 to excite it to emit the scintillator light 112. The scintillator layer 106 may have a thickness of between about 50 μm and about 150 μm. The scintillator layer 108 may have a thickness of between about 150 μm and about 450 μm.

The photodiode 114 and the photodiode 122 are disposed at a side of the scintillator layers 106, 108 opposite to the x-ray source 102. As shown in FIG. 1, the photodiode 114 may be disposed between the second scintillator layer 108 and the photodiode 122. The photodiode 114 may comprise a semiconductor layer 116 interposed between electrodes 118 and 120. The electrodes 118 and 120 may comprise tin oxide, zinc oxide, indium tin oxide (ITO), indium zinc oxide (IZO), antimony tin oxide (AZO), fluorine-doped tin oxide (FTO), aluminum-doped zinc oxide (AZO) or other suitable transparent conductive materials. The semiconductor layer 116 may comprise an amorphous silicon layer. The semiconductor layer 116 may have a thickness of between 0.5 and 2 μm. The light absorption range of the semiconductor layer 116 may substantially include all the wavelength range of the scintillator light 110. The photodiode 122 may comprise a semiconductor layer 124 interposed between electrodes 126 and 128. The semiconductor layer 124 may comprise a polysilicon layer and has a thickness of between about 0.05 and about 1 μm. The light absorption range of the semiconductor layer 124 may substantially include all the wavelength range of the scintillator light 112. In the present embodiment, the photodiode 122 is a vertical type photodiode, in which the electrodes 118 and 120 are disposed over and below the semiconductor layer 124, respectively. The electrode 118 may be a p-type electrode. The electrode 120 may be an n-type electrode. It can be understood that the position or the polarity of the electrodes 118 and 120 may be exchanged. The photodiode 122 may be a horizontal type photodiode, in which the electrodes 126 and 128 are disposed on two sides of the semiconductor layer 124. The electrode 126 may be an p-type electrode, and the electrode 128 may be an n-type electrode. The position or the polarity of the electrodes 126 and 128 may be exchanged.

The photodiode 114 may be electrically connected the thin film transistor (TFT) 130 and the data line 134. The TFT, which may be used as a switch for controlling the transmission of the electrical signals, is typically formed of a gate electrode, an active layer, and source and drain electrodes. The photodiode 122 may be electrically connected to the TFT 132. For example, the TFT 130 may be used as a switch for controlling whether the electrical signals from the photodiode 114 are transmitted to the data line 134 after the scintillator light 110 is absorbed by the photodiode 114. The photodiode 122 may be electrically connected the thin film transistor (TFT) 132. For example, the TFT 132 may be used as a switch for controlling whether the electrical signals from the photodiode 122 are transmitted to the data line 136 after the scintillator light 112 is absorbed by the photodiode 122. The TFTs 130 and 132 may be electrically connected to the same gate circuit for opening or closing the TFTs 130 and 132 at the same time, such that the electrical signals produced from the photodiodes 114 and 122 may be transmitted to the data lines 134 and 136 simultaneously. Thus, only once x-ray irradiation is needed, for the images sensed by the low energy x-ray 104a and the high energy x-ray 104b to be obtained from the photodiode 114 and the photodiode 122 at the same time. Thus, the motion blur problem of the conventional x-ray image sensing device is resolved. In addition, in the present embodiment, the photodiode 122 may be formed using low temperature polysilicon (LTPS) techniques since the photodiode 122 is the horizontal type polysilicon photodiode, and accordingly the photodiode 122 may be formed during the fabrication of the TFTs 130 and 132.

Figure 2:
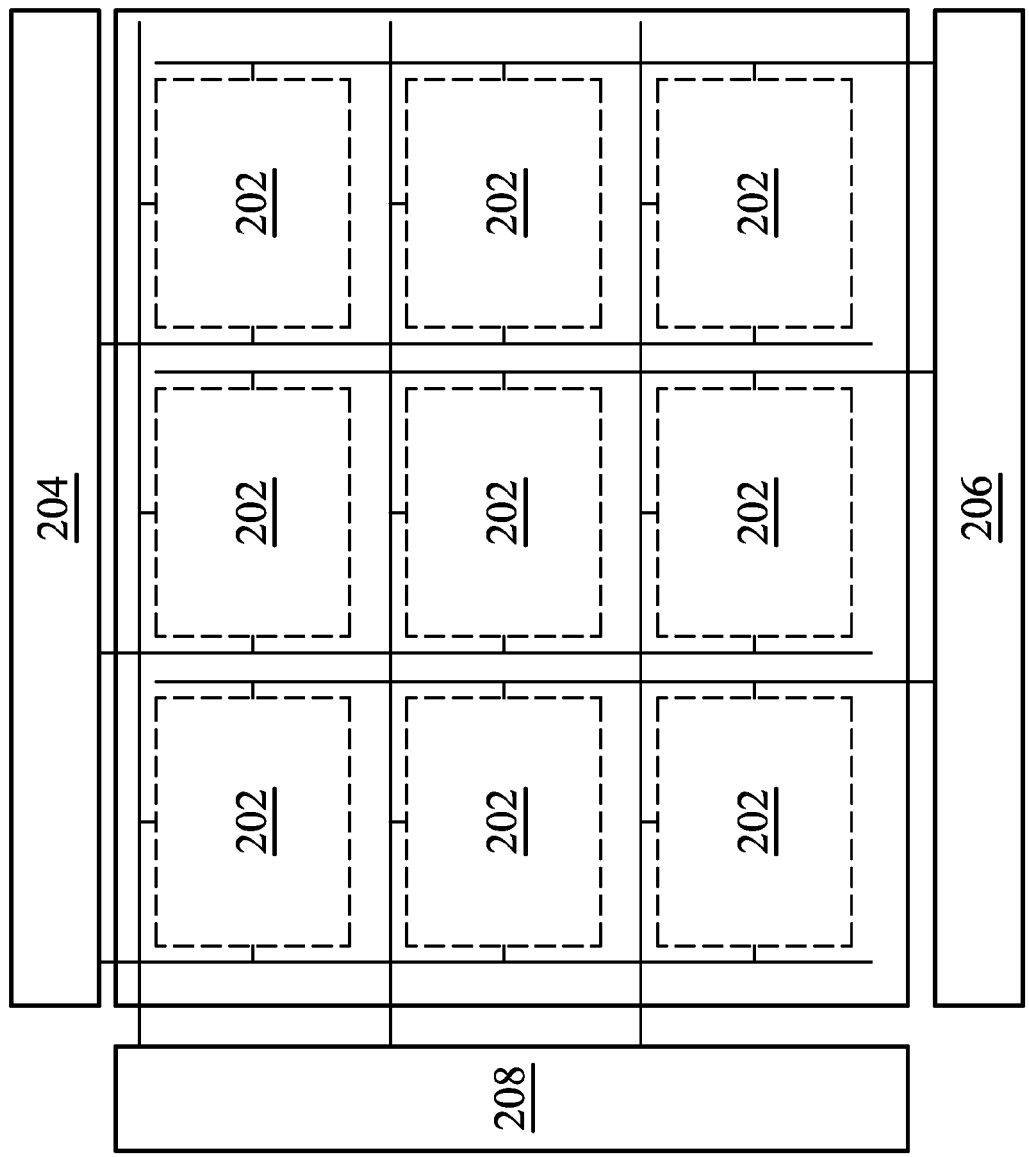
FIG. 2 shows a top view of an x-ray sensing module which includes an array formed of the plurality of x-ray sensing devices shown in FIG. 1 according to an embodiment of the present invention.

FIG. 2 shows a top view of an x-ray sensing module which includes an array formed of the plurality of x-ray sensing devices shown in FIG. 1 according to an embodiment of the present invention. A plurality of x-ray image sensing devices 202 may be formed on the substrate, and each of the x-ray image sensing devices may comprise at least two scintillator layers having different energy absorption ranges and two photodiode detecting device. A high energy x-ray driver circuit 204, a low energy x-ray driver circuit 206 and a gate circuit 208 are formed around the array of the x-ray sensing devices and switch on-off the x-ray image sensing devices through time sequence to obtain x-ray sensing images obtained from the array of the x-ray sensing devices. In an embodiment, the high energy x-ray driver circuit 204 and the low energy x-ray driver circuit 206 may be separately arranged. In another embodiment, the high energy x-ray driver circuit 204 and the low energy x-ray driver circuit 206 may be integrated together.

Figure 3:
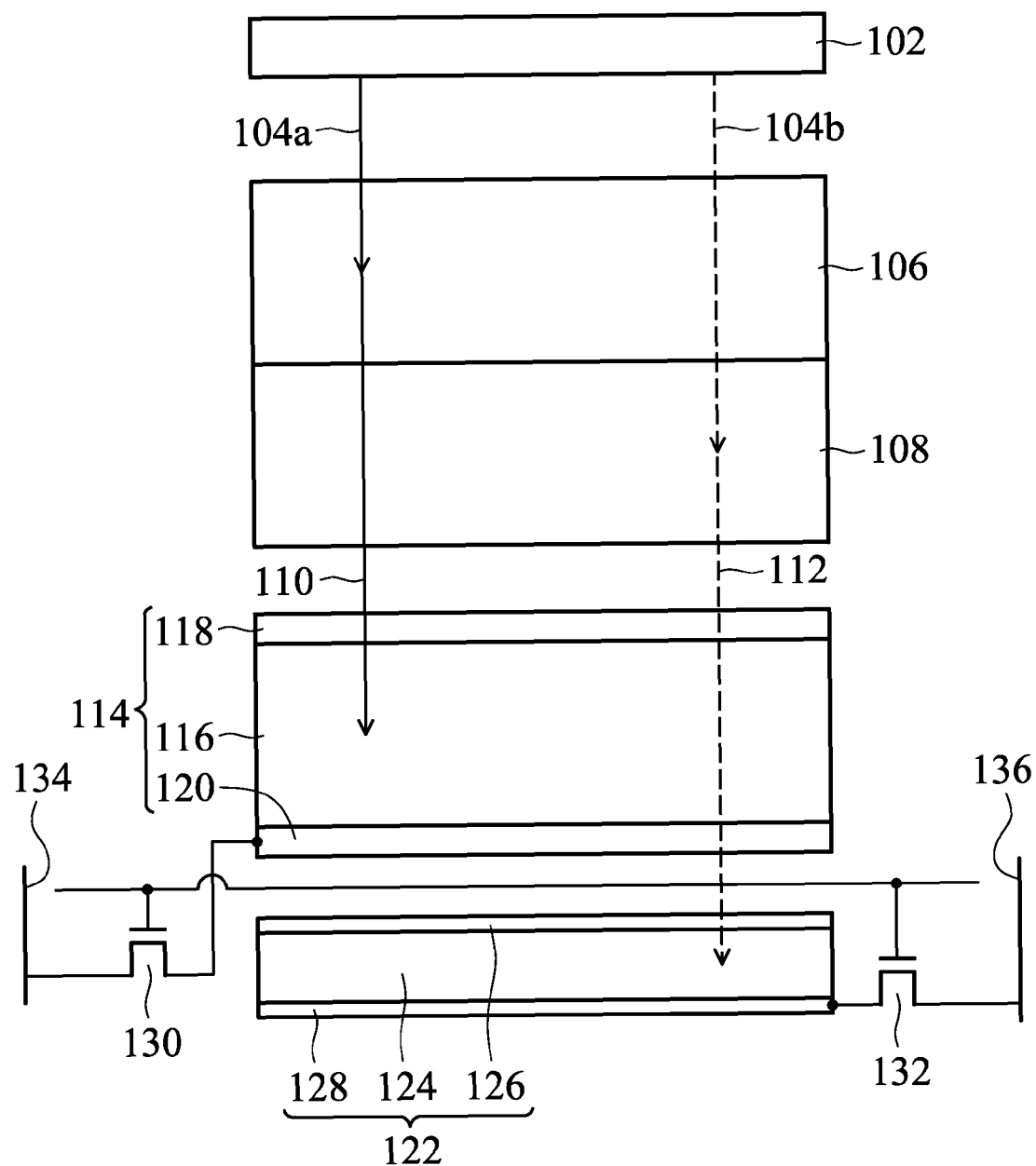
FIG. 3 shows a scheme of an x-ray sensing device and its related devices according to another embodiment of the present invention.

FIG. 3 shows a scheme of an x-ray sensing device and its related devices according to another embodiment of the present invention. In this embodiment, the same reference numbers represent the same or similar devices described in the preceding embodiments unless further notice. The main difference between this embodiment and the embodiment shown in FIG. 1 is that the photodiode 122 is a vertical type photodiode. The photodiode 122 in this embodiment may be formed of the materials similar to the photodiode in the embodiment shown in FIG. 1. For example, the photodiode 122 may comprise a semiconductor layer 124 interposed between the electrodes 126 and 128. The electrode 126 may comprise tin oxide, zinc oxide, indium tin oxide (ITO), indium zinc oxide (IZO), antimony tin oxide (AZO), fluorine-doped tin oxide (FTO), aluminum-doped zinc oxide (AZO) or other suitable transparent conductive materials. The semiconductor layer 124 may comprise a polysilicon layer. The semiconductor layer 124 may have a thickness of between 0.5 and 2 μm. The light absorption range of the semiconductor layer 124 may substantially include all the wavelength ranges of the scintillator light 112. In the present embodiment, the photodiode 122 may be a vertical type photodiode similar with the photodiode 114. The electrodes 126, 128 of the photodiode 122 may be disposed over and below the semiconductor layer 124, respectively. The electrode 126 may be a p-type electrode, and the electrode 128 may be an n-type electrode. It can be understood that the position and the polarity of the electrodes 126 and 128 may be exchanged.

Figure 4:
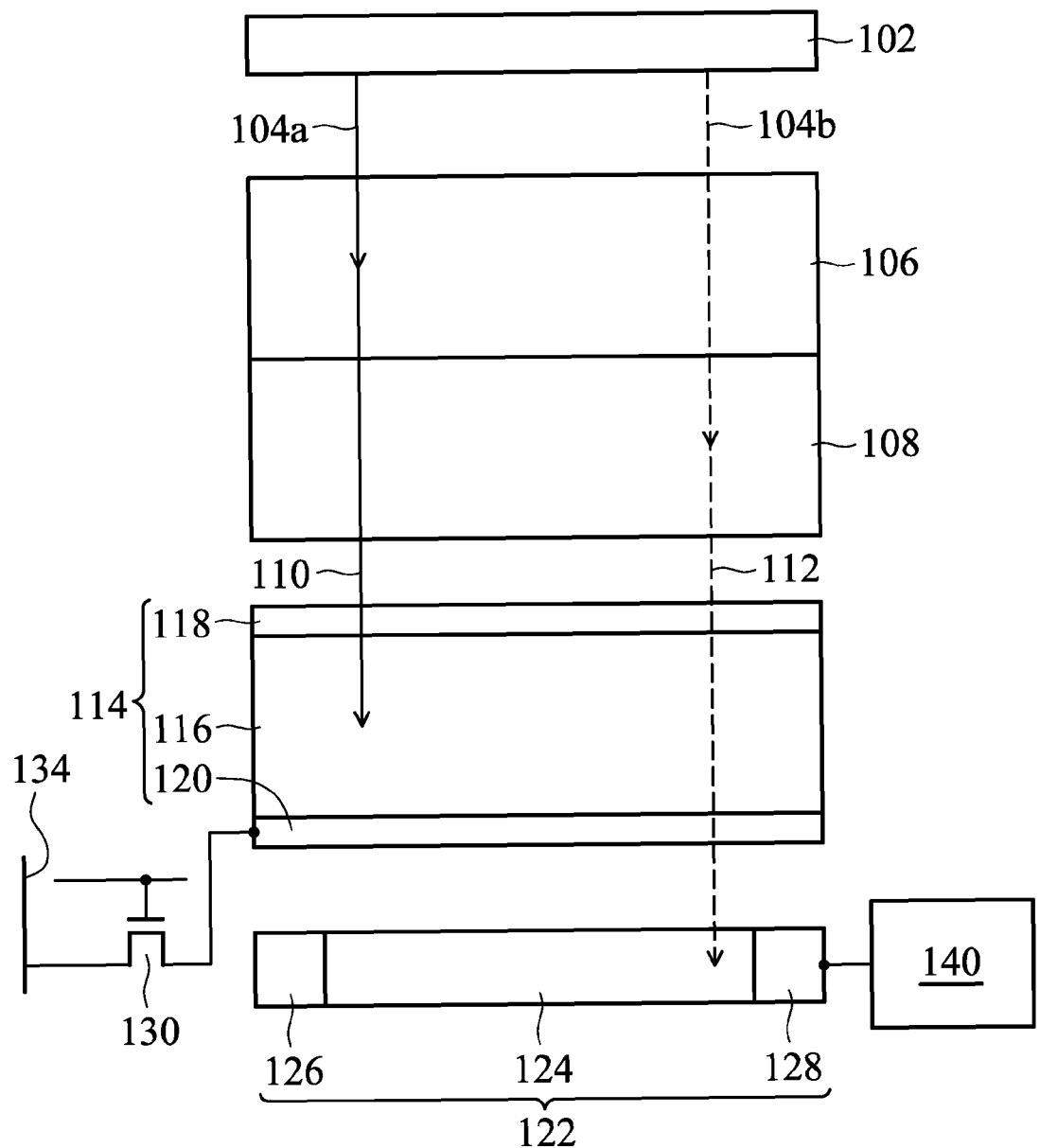
FIG. 4 shows a scheme of an x-ray sensing device and its related devices according to yet embodiment of the present invention.

FIG. 4 shows a scheme of an x-ray sensing device and its related devices according to yet embodiment of the present invention. In this embodiment, the same reference numbers represent the same or similar devices described in preceding embodiments unless further notice. The main difference between this embodiment and the embodiment shown in FIG. 1 is that the photodiode 122 is electrically connected to an active circuit 140 directly.

The electron mobility in the polysilicon is about 200~300 times faster than in the amorphous silicon because the grains in the polysilicon structure are arranged neatly. Thus, the horizontal type polysilicon photodiode 122 may be electrically connected to an active circuit 140 directly or become a part of the active circuit. The active circuit 140 may comprise a signal amplifier, a thin film transistor, a data line, a gate line or combinations thereof. The signals produced from the horizontal type polysilicon photodiode 122 may be processed by the active circuit 140 and then transmitted to the data line 136.

Figure 5:
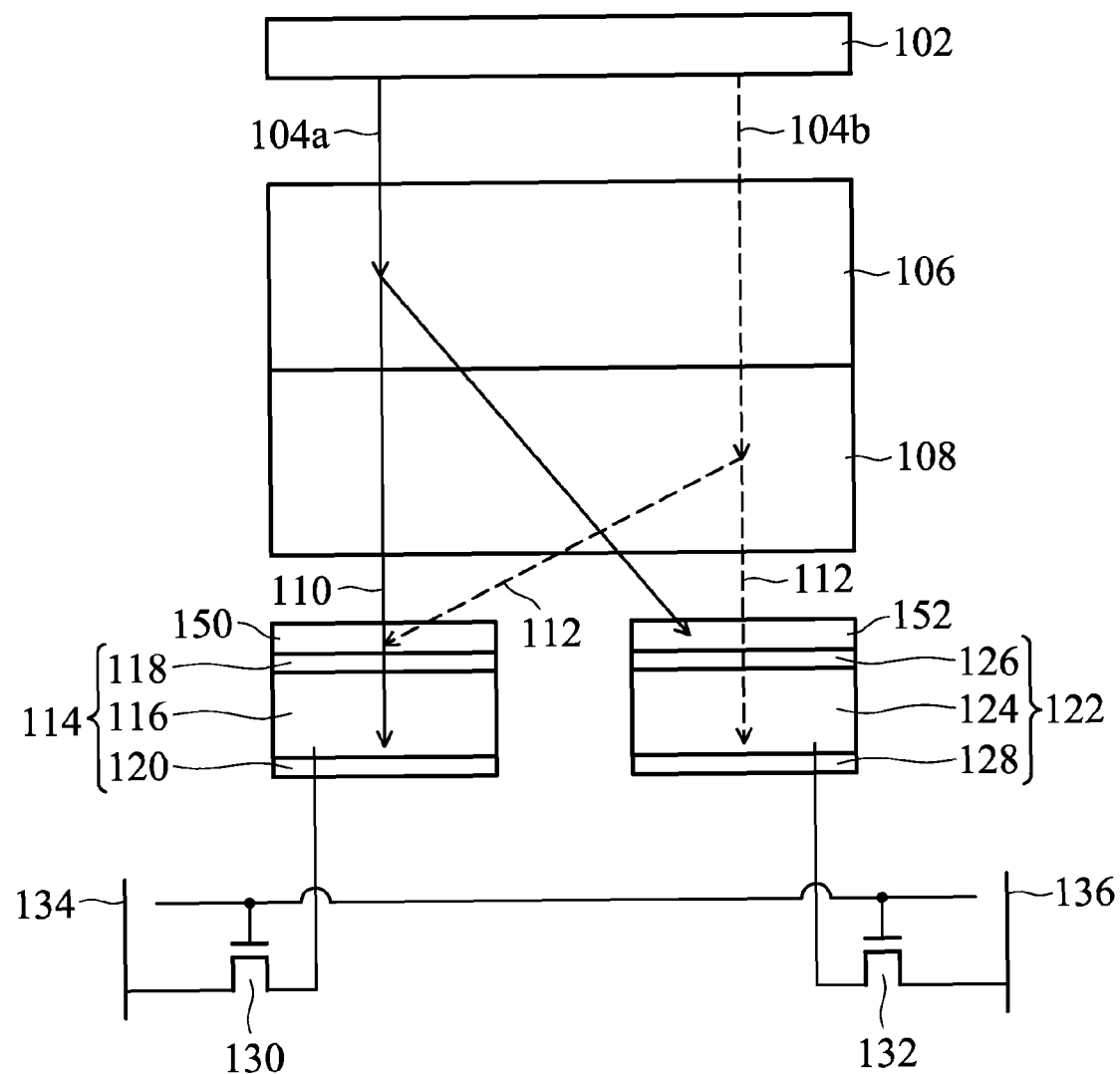
FIG. 5 shows a scheme of an x-ray sensing device and its related devices according to yet another embodiment of the present invention.

FIG. 5 shows a scheme of an x-ray sensing device and its related devices according to yet another embodiment of the present invention. In this embodiment, the same reference numbers represent the same or similar devices described in preceding embodiments unless further notice. The main difference between this embodiment and the embodiment shown in FIG. 1 is that the photodiode 114 and the photodiode 122 are arranged horizontally in respect to the scintillator layers 106 and 108. In an embodiment, the semiconductor layers 116 and 124 of the photodiodes 114 and 122 may be formed by the same or similar materials, for example, polysilicon. The semiconductor layers 116 and 124 may have a thickness of between about 0.5 and 2 μm. In this thickness, the semiconductor layers 116 and 124 may have the same light absorption range, such as the wavelength of between about 300 nm and 600 nm. In another embodiment, the semiconductor layers 116 and 124 of photodiodes 114 and 122 may have a different thickness but have overlapped light absorption ranges. A color filter 150 may be interposed between the photodiode 114 and the scintillator layer 108 for filtering the scintillator light 112 excited from the high energy x-ray 104*b*. A color filter 152 may be interposed between the photodiode 122 and the scintillator layer 108 for filtering the scintillator light 110 excited from the low energy x-ray 104*a*. Thus, only the scintillator light 110 excited from the low energy x-ray 104*a* can be detected by the photodiode 114, and only the scintillator light 112 excited from the high energy x-ray 104*b* can be detected by the photodiode 122. X-ray irradiation is needed only once, and the sensing images of the low energy x-ray 104*a* and the high energy x-ray 104*b* may be obtained simultaneously.

For example, in a specific embodiment, the low energy x-ray 104*a* may excite the scintillator layer 106 to emit a blue scintillator light 110 (e.g., 420 nm of wavelength), and the high energy x-ray 104*b* may excite the scintillator layer 108 to emit a green scintillator light 112 (e.g., 550 nm of wavelength). The semiconductor layer 116 of the photodiode 114 and the semiconductor layer 124 of the photodiode 122 may have a polysilicon layer having a thickness of between about 0.5 and about 2 μm. The polysilicon layer may have a wide light absorption range. For example, both of a green light and blue light may be absorbed by the semiconductor layers 116 and 124. The color filter 150 may filter all the wavelengths other than the blue light. The color filter 152 may filter all the wavelengths other than the green light. Thus, the photodiode 114 is only capable of detecting the blue scintillator light 110 excited by the low energy x-ray 104*a*, and the photodiode 122 is only capable of detecting the green scintillator light 112 excited by the high energy x-ray 104*b*.

In addition, the photodiode 114 and the photodiode 122 may have similar or the same structures and materials and are arranged horizontally. Thus, the photodiodes 114 and 122 may be formed on the same substrate and can be fabricated in the same process, and then the color filters 150 and 152 may be disposed on the photodiodes 114 and 122.

Figure 6:
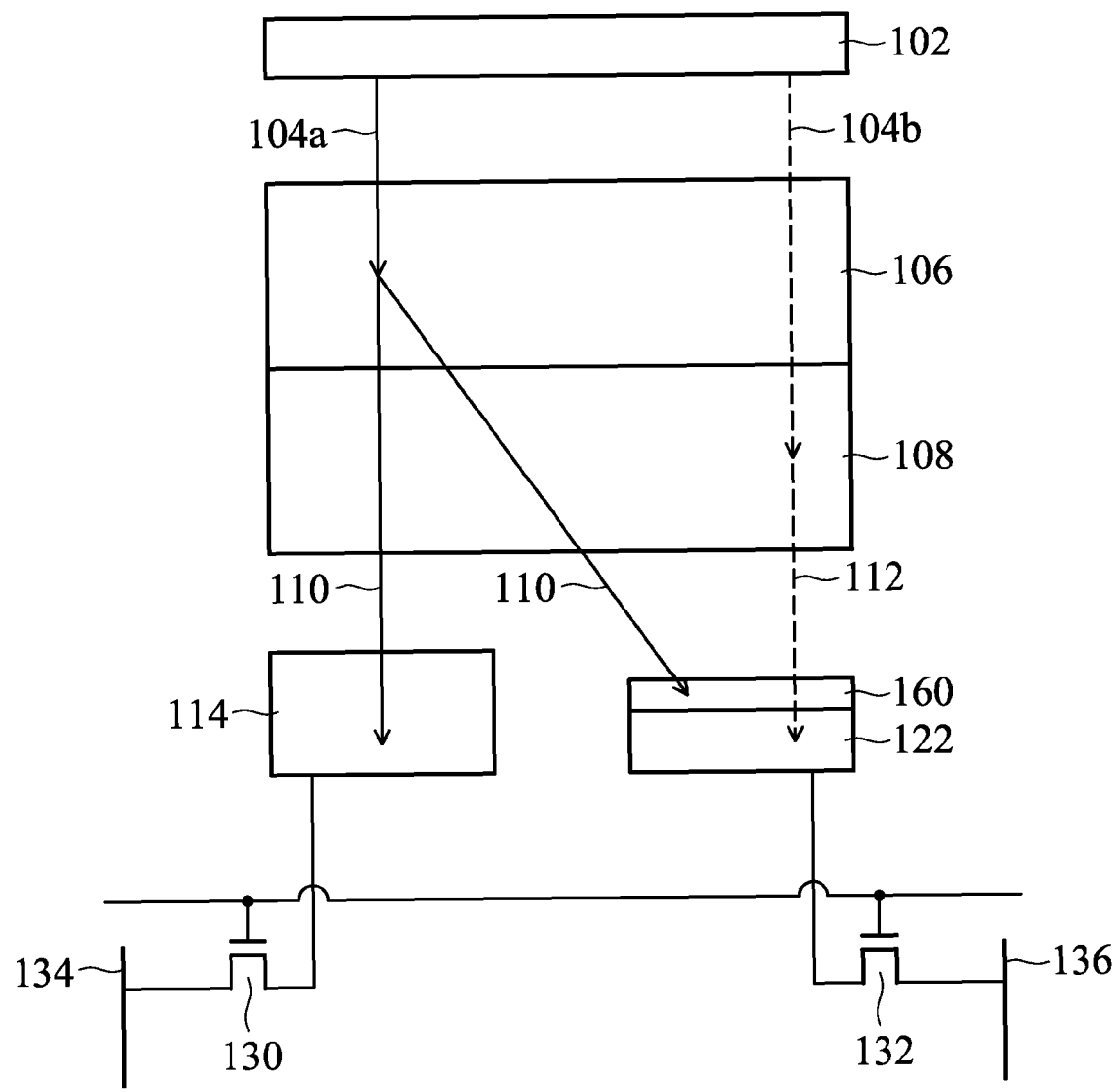
FIG. 6 shows a scheme of an x-ray sensing device and its related devices according to yet further embodiment of the present invention.

FIG. 6 shows a scheme of an x-ray sensing device and its related devices according to yet a further embodiment of the present invention. In this embodiment, the same reference numbers represent the same or similar devices described in preceding embodiments unless further notice. The main difference between this embodiment and the embodiment shown in FIG. 1 is that the photodiode 114 and the photodiode 122 are formed of the same material but have a different thickness. For example, each of the semiconductor layers 116 and 124 of the photodiodes 114 and 122 may have an amorphous layer. However, the semiconductor layer 116 of the photodiode 114 may have a thickness of between about 1 and about 2 μm. The semiconductor layer 124 of the photodiode 122 may have a thickness of between about 0.1 and about 0.5 μm and may have a light absorption range including at least a portion of the light absorption range of the semiconductor layer 116. A color filter 160 may be interposed between the photodiode 114 and the scintillator layer 108 for filtering the scintillator light 112 excited from the low energy x-ray 104*b*. Thus, only the scintillator light 110 excited from the low energy x-ray 104*a* can be detected by the photodiode 114, and only scintillator light 112 excited from the high energy x-ray 104*b* can be detected by the photodiode 122. X-ray irradiation is needed on once, and the sensing images of the low energy x-ray 104*a* and the high energy x-ray 104*b* may be obtained simultaneously.

For example, in a specific embodiment, the low energy x-ray 104*a* may excite the scintillator layer 106 to emit a green scintillator light 110 (e.g., 550 nm of wavelength), and the high energy x-ray 104*b* may excite the scintillator layer 108 to emit a blue scintillator light 112 (e.g., 550 nm of wavelength). The semiconductor layer 116 of the photodiode 114 has a polysilicon layer having a thickness of between about 1 μm and about 2 μm. The semiconductor layer 124 of the photodiode 122 may have a polysilicon layer having a thickness of between about 0.1 and about 0.5 μm. Thus, the semiconductor layer 116 of the photodiode 114 may have a wide light absorption range which may absorb both of green light and blue light. Thus, the semiconductor layer 124 of the photodiode 122 may only absorb the blue light. A color filter 160 may disposed between the scintillator layer 108 and the photodiode 114 and is capable of filtering the blue light. Thus, the photodiode 114 is only capable of detecting the green scintillator light 110 excited by the low energy x-ray 104a, and the photodiode 122 is only capable of detecting the blue scintillator light 112 excited by the high energy x-ray 104b. The photodiode 114 and the photodiode 122 may have similar or the same structures and materials and are arranged horizontally. Thus, since the structures and materials of the photodiodes 114 and 122 are similar or the same, they may be formed on the same substrate and can be fabricated in the same process. The color filter 160 may be disposed on the photodiodes 114 thereafter.

In summary, embodiments of the present invention provide an x-ray sensing device which may obtain a high energy x-ray sensing image and a low energy x-ray sensing image simultaneously with the need of only once x-ray irradiation, and therefore the motion blur problem of the x-ray image can be avoided.

While the preferred embodiments of the invention have been described above, it will be recognized and understood that various modifications can be made in the invention and the appended claims are intended to cover all such modifications which may fall within the spirit and scope of the invention.

What is claimed is:
1. An x-ray image sensing device, comprising:
  a first scintillator layer and a second scintillator layer overlapping with each other and having different energy absorptions of an incident light emitted from an x-ray source such that a first scintillator light and a second scintillator light are emitted from the first scintillator layer and the second scintillator layer, respectively, wherein the first scintillator light and the second scintillator light have different wavelengths;
  a first photodiode disposed at a side of the first and the second scintillator layers opposite to the X-ray source, wherein the first photodiode is a vertical type photodiode and comprises an amorphous silicon layer; and
  a second photodiode disposed at the side of the first and the second scintillator layers opposite to the X-ray source, wherein the first photodiode and the second photodiode are capable of sensing the first scintillator light and the second scintillator light, wherein the second photodiode is a horizontal type photodiode and comprises a polysilicon layer.
2. The x-ray image sensing device of claim 1, wherein the first and the second photodiodes are overlapped in respect to the first and the second scintillator layers.
3. The x-ray image sensing device of claim 1, wherein the first and the second photodiodes are arranged horizontally in respect to the first and the second scintillator layers.

4. The x-ray image sensing device of claim 3, wherein the first photodiode and the second photodiode comprise a first polysilicon layer and a second polysilicon layer, respectively.
5. The x-ray image sensing device of claim 4, further comprising a first color filter disposed between the second scintillator layer and the first photodiode and a second color filter disposed between the second scintillator layer and the second photodiode, wherein the first color filter is capable of filtering the second scintillator light, and the second color filter is capable of filtering the first scintillator light.
6. The x-ray image sensing device of claim 5, wherein the first polysilicon layer and the second polysilicon layer have the same thickness.
7. The x-ray image sensing device of claim 4, further comprising a color filter disposed between the second scintillator layer and the second photodiode, wherein the color filter is capable of filtering the first scintillator light.
8. The x-ray image sensing device of claim 7, wherein there is no color filter interposed between the first photodiode and the second scintillator layer.
9. The x-ray image sensing device of claim 7, wherein the second polysilicon layer has a thickness thinner than that of the first polysilicon layer.
10. The x-ray image sensing device of claim 9, wherein the second polysilicon layer has a thickness of between about 0.1 and about 0.5 μm.
11. The x-ray image sensing device of claim 1, wherein the second photodiode is electrically connected to an active circuit device or becomes a part of the active circuit device.
12. The x-ray image sensing device of claim 11, wherein the active circuit device comprises a signal amplifier, a thin film transistor, a data line, a gate line or combinations thereof.
13. The x-ray image sensing device of claim 1, wherein both the first and the second photodiodes are vertical type photodiodes.
14. The x-ray image sensing device of claim 1, wherein the first photodiode is electrically connected to a first thin film transistor and the second photodiode is electrically connected to a second thin film transistor.
15. The x-ray image sensing device of claim 14, wherein the first photodiode and the second photodiode are electrically connected to the same gate circuit.
16. The x-ray image sensing device of claim 1, wherein the first scintillator layer comprises CsI:Tl CsI:Na, CdWO4, YTaO4:Nb, Gd2O2S:Tb, Gd2O2S:Pr,Ce,F, CaWO4, CaHfO3:Ce, SrHfO3:Ce, BaHfO3:Ce, NaI:Tl, LaCl3:Ce, LaBr3:Ce, Bi4Ge3O12, Lu2SiO5:Ce, Gd2SiO5:Ce, YAlO3:Ce, LuAlO3:Ce, Lu2Si2O7:Ce, or combinations thereof.
17. The x-ray image sensing device of claim 1, wherein the second scintillator layer comprises Gd3Ga5O12:Cr,Ce, Y1.34Gd0.6Eu0.06O3, Y1.34Gd0.6Pr0.06O3, Lu2O3:Eu, Tb or combinations thereof.
18. An x-ray image sensing module, comprising:
  a substrate;
  a plurality of the x-ray image sensing devices of claim 1 disposed on the substrate;
  a gate driver circuit electrically connected to the x-ray image sensing devices; and
  a data driver circuit electrically connected the x-ray image sensing devices, wherein the gate driver circuit and the data driver circuit are capable of switching on-off the x-ray image sensing devices through time sequence.

* * * * *